(12) United States Patent
Nordyke et al.

(10) Patent No.: US 8,271,301 B1
(45) Date of Patent: Sep. 18, 2012

(54) METHOD OF PROVIDING INSURANCE

(75) Inventors: Craig K. Nordyke, Huntersville, NC (US); Bret Benham, Weddington, NC (US)

(73) Assignee: Teachers Insurance and Annuity Association, New York, NY (US)

( * ) Notice: Subject to any disclaimer, the term of this patent is extended or adjusted under 35 U.S.C. 154(b) by 488 days.

(21) Appl. No.: 11/757,284

(22) Filed: Jun. 1, 2007

Related U.S. Application Data

(60) Provisional application No. 60/810,163, filed on Jun. 2, 2006.

(51) Int. Cl.
*G06Q 40/00* (2012.01)
(52) U.S. Cl. .............................. 705/4; 705/35; 705/36 R
(58) Field of Classification Search .................. 705/4, 35
See application file for complete search history.

(56) References Cited

U.S. PATENT DOCUMENTS

| | | | | |
|---|---|---|---|---|
| 4,648,037 | A * | 3/1987 | Valentino | 705/36 R |
| 5,655,085 | A * | 8/1997 | Ryan et al. | 705/4 |
| 5,752,236 | A * | 5/1998 | Sexton et al. | 705/4 |
| 2003/0105701 | A1* | 6/2003 | Brown et al. | 705/36 |
| 2003/0204433 | A1* | 10/2003 | Botscheck et al. | 705/9 |
| 2004/0176989 | A1* | 9/2004 | Darr | 705/4 |
| 2004/0181436 | A1* | 9/2004 | Lange | 705/4 |
| 2005/0086085 | A1 | 4/2005 | Berlin et al. | |

OTHER PUBLICATIONS

"TIAA-CREF Life Offers 10-Year and 15-Year Level Term Life Insurance Guaranteed Level Premiums for Duration of Policy," PR Newswire (Mar. 10, 2003), p. 1.*

Bultman, Ralph D. "Now is the Time to Buy Level-Term Life Insurance," The Planner, (Nov./Dec. 1999), vol. 14, Iss. 4, p. 1-3.*
"First Penn Introduces E-Ticket for Easy Online Pre-Applications," Business Wire, (Aug. 19, 2002), p. 1.*
"Variable Universal Life Insurance: Is it Worth it?" James H. Hunt, F.S.A., available at http://www.consumerfed.org/pdfs/vulreport0203.pdf, Feb. 2003.
"Universal Life Insurance," Genworth Financial, available at http://www.genworth.com/genworth/life_insurance/universal_life.jsp, accessed Feb. 17, 2006.
"Fool.com: How Advisors Get Paid [Advisor Center]," The Motley Fool, available at http://www.fool.com/Server/printarticle.aspx?file=/fa/finadvice04.htm, accessed Mar. 27, 2006.
"Life Insurance 101," Reliaquote, available at http://www.reliaquote.com/termlife/info/life101.asp?sourceid=74100000034000000000 &..., accessed Feb. 17, 2006.

(Continued)

*Primary Examiner* — Elizabeth Rosen
(74) *Attorney, Agent, or Firm* — Walter G. Hanchuk; Chadbourne and Parke, LLP

(57) ABSTRACT

This disclosure details the implementation of methods for providing a permanent life insurance policy, such as a universal life or variable universal life insurance policy, that may provide a level cost of insurance and may be marketed to clients of an asset manager. A need exists for a life insurance policy that provides level cost of insurance rates for a specific duration, while providing a death benefit and a cash value. The instant invention provides a method and an insurance policy that addresses these and other issues. In some embodiments, the level cost of insurance rate for a universal or variable universal life insurance policy may be provided for a fixed period of time and determined based on the corresponding cost of insurance rate for a comparable term life insurance policy having a term substantially similar to that fixed period of time. In further embodiments, the asset manager may receive compensation for advising the client based on the total value of assets in the insurance policy.

62 Claims, 6 Drawing Sheets

OTHER PUBLICATIONS

"Universal Life Insurance," New York Life Insurance, date unknown.

"Term Essential," Prudential Financial, available at http://www.prudential.com/productsAndServices/0,1474,intPageID%253D1740%2526bln..., accessed Feb. 17, 2006.

"Universal and Variable Life Insurance," ACES Publications, Alabama Cooperative Extension System, available at http://www.aces.edu/pubs/docs/H/HE-0658/, accessed Feb. 17, 2006.

"Variable universal life insurance," Wikipedia, available at http://en.wikipedia.org/wiki/Variable_universal_life_insurance, accessed Apr. 10, 2006.

"What is Universal Life Insurance?" State Farm Insurance, available at http://www.statefarm.com/insuranc/universal.htm, accessed Feb. 17, 2006.

"Coverage Amounts," State Farm Insurance, available at http://www.statefarm.com/insurance/life/dthbnopt.htm, accessed Feb. 17, 2006.

"How Universal Life Insurance works," State Farm Insurance, available at http://www.statefarm.com/insurance/life/univswk.htm, accessed Feb. 17, 2006.

"Contract for Financial Advice," Sunset Financial Services, Inc., date unknown.

* cited by examiner

FIGURE 3A

| Policy Year 3.01 | Age 3.05 | Premiums Paid 3.10 | State Premium Tax Charge (a) 3.15 | Cost of Insurance (b) 3.20 | Cost of Riders (c) 3.25 | Total Insurance Costs (a+b+c) 3.30 | Cash Surrender Value (end of year) 3.35 | Death Benefit Proceeds (end of year) 3.40 |
|---|---|---|---|---|---|---|---|---|
| 1 | 45 | 8,500 | 128 | 666 | 0 | 794 | 8,208 | 1,008,208 |
| 2 | 46 | 8,500 | 128 | 719 | 0 | 847 | 16,875 | 1,016,875 |
| 3 | 47 | 8,500 | 128 | 777 | 0 | 905 | 26,025 | 1,026,025 |
| 4 | 48 | 8,500 | 128 | 838 | 0 | 966 | 35,685 | 1,035,685 |
| 5 | 49 | 8,500 | 128 | 905 | 0 | 1,033 | 45,880 | 1,045,880 |
| 6 | 50 | 8,500 | 128 | 977 | 0 | 1,105 | 56,639 | 1,056,639 |
| 7 | 51 | 8,500 | 128 | 1,070 | 0 | 1,198 | 67,975 | 1,067,975 |
| 8 | 52 | 8,500 | 128 | 1,173 | 0 | 1,301 | 79,914 | 1,079,914 |
| 9 | 53 | 8,500 | 128 | 1,286 | 0 | 1,414 | 92,485 | 1,092,485 |
| 10 | 54 | 8,500 | 128 | 1,409 | 0 | 1,537 | 106,015 | 1,106,015 |
| 11 | 55 | 8,500 | 128 | 1,545 | 0 | 1,673 | 120,292 | 1,120,292 |
| 12 | 56 | 8,500 | 128 | 1,716 | 0 | 1,844 | 135,328 | 1,135,328 |
| 13 | 57 | 8,500 | 128 | 1,907 | 0 | 2,035 | 151,153 | 1,151,153 |
| 14 | 58 | 8,500 | 128 | 2,119 | 0 | 2,247 | 167,797 | 1,167,797 |
| 15 | 59 | 8,500 | 128 | 2,355 | 0 | 2,483 | 185,288 | 1,185,288 |
| 16 | 60 | 8,500 | 128 | 2,617 | 0 | 2,745 | 203,655 | 1,203,655 |
| 17 | 61 | 8,500 | 128 | 2,939 | 0 | 3,067 | 222,894 | 1,222,894 |
| 18 | 62 | 8,500 | 128 | 3,301 | 0 | 3,429 | 243,020 | 1,243,020 |
| 19 | 63 | 8,500 | 128 | 3,707 | 0 | 3,835 | 264,046 | 1,264,046 |
| 20 | 64 | 8,500 | 128 | 4,164 | 0 | 4,292 | 285,979 | 1,285,979 |
| 21 | 65 | 8,500 | 128 | 4,676 | 0 | 4,804 | 309,697 | 1,309,697 |
| 22 | 66 | 8,500 | 128 | 5,285 | 0 | 5,413 | 334,409 | 1,334,409 |
| 23 | 67 | 8,500 | 128 | 5,974 | 0 | 6,102 | 360,102 | 1,360,102 |
| 24 | 68 | 8,500 | 128 | 6,753 | 0 | 6,881 | 386,750 | 1,386,750 |
| 25 | 69 | 8,500 | 128 | 7,633 | 0 | 7,761 | 414,314 | 1,414,314 |
| 26 | 70 | 8,500 | 128 | 8,628 | 0 | 8,756 | 442,738 | 1,442,738 |
| 27 | 71 | 8,500 | 128 | 9,778 | 0 | 9,906 | 471,918 | 1,471,918 |
| 28 | 72 | 8,500 | 128 | 11,082 | 0 | 11,210 | 501,749 | 1,501,749 |
| 29 | 73 | 8,500 | 128 | 12,560 | 0 | 12,688 | 532,093 | 1,532,093 |
| 30 | 74 | 8,500 | 128 | 14,235 | 0 | 14,363 | 562,783 | 1,562,783 |
| 31 | 75 | 8,500 | 128 | 16,133 | 0 | 16,261 | 593,610 | 1,593,610 |
| 32 | 76 | 8,500 | 128 | 17,803 | 0 | 17,931 | 624,821 | 1,624,821 |
| 33 | 77 | 8,500 | 128 | 19,645 | 0 | 19,773 | 656,263 | 1,656,263 |
| 34 | 78 | 8,500 | 128 | 21,541 | 0 | 21,669 | 687,896 | 1,687,896 |
| 35 | 79 | 8,500 | 128 | 23,592 | 0 | 23,720 | 719,573 | 1,719,573 |

FIGURE 3B

| Policy Year | Age | Premiums Paid | State Premium Tax Charge (a) | Cost of Insurance (b) | Cost of Riders (c) | Total Insurance Costs (a+b+c) | Cash Surrender Value (end of year) | Death Benefit Proceeds (end of year) |
|---|---|---|---|---|---|---|---|---|
| 3 01 | 3 05 | 3 10 | 3 15 | 3 20 | 3 25 | 3 30 | 3 35 | 3 40 |
| 1 | 45 | 8,500 | 128 | 869 | 0 | 997 | 7,998 | 1,007,998 |
| 2 | 46 | 8,500 | 128 | 869 | 0 | 997 | 16,497 | 1,016,497 |
| 3 | 47 | 8,500 | 128 | 869 | 0 | 997 | 25,528 | 1,025,528 |
| 4 | 48 | 8,500 | 128 | 869 | 0 | 997 | 35,124 | 1,035,124 |
| 5 | 49 | 8,500 | 128 | 869 | 0 | 997 | 45,321 | 1,045,321 |
| 6 | 50 | 8,500 | 128 | 869 | 0 | 997 | 56,156 | 1,056,156 |
| 7 | 51 | 8,500 | 128 | 869 | 0 | 997 | 67,670 | 1,067,670 |
| 8 | 52 | 8,500 | 128 | 869 | 0 | 997 | 79,904 | 1,079,904 |
| 9 | 53 | 8,500 | 128 | 869 | 0 | 997 | 92,904 | 1,092,904 |
| 10 | 54 | 8,500 | 128 | 869 | 0 | 997 | 107,021 | 1,107,021 |
| 11 | 55 | 8,500 | 128 | 1,545 | 0 | 1,673 | 121,364 | 1,121,364 |
| 12 | 56 | 8,500 | 128 | 1,716 | 0 | 1,844 | 136,471 | 1,136,471 |
| 13 | 57 | 8,500 | 128 | 1,907 | 0 | 2,035 | 152,371 | 1,152,371 |
| 14 | 58 | 8,500 | 128 | 2,119 | 0 | 2,247 | 169,094 | 1,169,094 |
| 15 | 59 | 8,500 | 128 | 2,355 | 0 | 2,483 | 186,670 | 1,186,670 |
| 16 | 60 | 8,500 | 128 | 2,617 | 0 | 2,745 | 205,128 | 1,205,128 |
| 17 | 61 | 8,500 | 128 | 2,939 | 0 | 3,067 | 224,464 | 1,224,464 |
| 18 | 62 | 8,500 | 128 | 3,301 | 0 | 3,429 | 244,693 | 1,244,693 |
| 19 | 63 | 8,500 | 128 | 3,707 | 0 | 3,835 | 265,829 | 1,265,829 |
| 20 | 64 | 8,500 | 128 | 4,164 | 0 | 4,292 | 287,879 | 1,287,879 |
| 21 | 65 | 8,500 | 128 | 4,676 | 0 | 4,804 | 311,726 | 1,311,726 |
| 22 | 66 | 8,500 | 128 | 5,285 | 0 | 5,413 | 336,578 | 1,336,578 |
| 23 | 67 | 8,500 | 128 | 5,974 | 0 | 6,102 | 362,420 | 1,362,420 |
| 24 | 68 | 8,500 | 128 | 6,753 | 0 | 6,881 | 389,227 | 1,389,227 |
| 25 | 69 | 8,500 | 128 | 7,633 | 0 | 7,761 | 416,961 | 1,416,961 |
| 26 | 70 | 8,500 | 128 | 8,628 | 0 | 8,756 | 445,566 | 1,445,566 |
| 27 | 71 | 8,500 | 128 | 9,778 | 0 | 9,906 | 474,941 | 1,474,941 |
| 28 | 72 | 8,500 | 128 | 11,082 | 0 | 11,210 | 504,979 | 1,504,979 |
| 29 | 73 | 8,500 | 128 | 12,560 | 0 | 12,688 | 535,545 | 1,535,545 |
| 30 | 74 | 8,500 | 128 | 14,235 | 0 | 14,363 | 566,472 | 1,566,472 |
| 31 | 75 | 8,500 | 128 | 16,133 | 0 | 16,261 | 597,552 | 1,597,552 |
| 32 | 76 | 8,500 | 128 | 17,803 | 0 | 17,931 | 629,033 | 1,629,033 |
| 33 | 77 | 8,500 | 128 | 19,645 | 0 | 19,773 | 660,765 | 1,660,765 |
| 34 | 78 | 8,500 | 128 | 21,541 | 0 | 21,669 | 692,707 | 1,692,707 |
| 35 | 79 | 8,500 | 128 | 23,592 | 0 | 23,720 | 724,714 | 1,724,714 |

FIGURE 3C

| Policy Year 3 01 | Age 3 05 | Premiums Paid 3 10 | State Premium Tax Charge (a) 3 15 | Cost of Insurance (b) 3 20 | Cost of Riders (c) 3 25 | Total Insurance Costs (a+b+c) 3 30 | Cash Surrender Value (end of year) 3 35 | Death Benefit Proceeds (end of year) 3 40 |
|---|---|---|---|---|---|---|---|---|
| 1 | 45 | 8,500 | 128 | 1,515 | 0 | 1,643 | 7,330 | 1,007,330 |
| 2 | 46 | 8,500 | 128 | 1,515 | 0 | 1,643 | 15,120 | 1,015,120 |
| 3 | 47 | 8,500 | 128 | 1,515 | 0 | 1,643 | 23,397 | 1,023,397 |
| 4 | 48 | 8,500 | 128 | 1,515 | 0 | 1,643 | 32,192 | 1,032,192 |
| 5 | 49 | 8,500 | 128 | 1,515 | 0 | 1,643 | 41,538 | 1,041,538 |
| 6 | 50 | 8,500 | 128 | 1,515 | 0 | 1,643 | 51,469 | 1,051,469 |
| 7 | 51 | 8,500 | 128 | 1,515 | 0 | 1,643 | 62,021 | 1,062,021 |
| 8 | 52 | 8,500 | 128 | 1,515 | 0 | 1,643 | 73,234 | 1,073,234 |
| 9 | 53 | 8,500 | 128 | 1,515 | 0 | 1,643 | 85,150 | 1,085,150 |
| 10 | 54 | 8,500 | 128 | 1,515 | 0 | 1,643 | 97,811 | 1,097,811 |
| 11 | 55 | 8,500 | 128 | 1,515 | 0 | 1,643 | 111,581 | 1,111,581 |
| 12 | 56 | 8,500 | 128 | 1,515 | 0 | 1,643 | 126,254 | 1,126,254 |
| 13 | 57 | 8,500 | 128 | 1,515 | 0 | 1,643 | 141,890 | 1,141,890 |
| 14 | 58 | 8,500 | 128 | 1,515 | 0 | 1,643 | 158,552 | 1,158,552 |
| 15 | 59 | 8,500 | 128 | 1,515 | 0 | 1,643 | 176,307 | 1,176,307 |
| 16 | 60 | 8,500 | 128 | 1,515 | 0 | 1,643 | 195,226 | 1,195,226 |
| 17 | 61 | 8,500 | 128 | 1,515 | 0 | 1,643 | 215,387 | 1,215,387 |
| 18 | 62 | 8,500 | 128 | 1,515 | 0 | 1,643 | 236,870 | 1,236,870 |
| 19 | 63 | 8,500 | 128 | 1,515 | 0 | 1,643 | 259,763 | 1,259,763 |
| 20 | 64 | 8,500 | 128 | 1,515 | 0 | 1,643 | 284,158 | 1,284,158 |
| 21 | 65 | 8,500 | 128 | 4,676 | 0 | 4,804 | 307,750 | 1,307,750 |
| 22 | 66 | 8,500 | 128 | 5,285 | 0 | 5,413 | 332,329 | 1,332,329 |
| 23 | 67 | 8,500 | 128 | 5,974 | 0 | 6,102 | 357,879 | 1,357,879 |
| 24 | 68 | 8,500 | 128 | 6,753 | 0 | 6,881 | 384,375 | 1,384,375 |
| 25 | 69 | 8,500 | 128 | 7,633 | 0 | 7,761 | 411,776 | 1,411,776 |
| 26 | 70 | 8,500 | 128 | 8,628 | 0 | 8,756 | 440,026 | 1,440,026 |
| 27 | 71 | 8,500 | 128 | 9,778 | 0 | 9,906 | 469,020 | 1,469,020 |
| 28 | 72 | 8,500 | 128 | 11,082 | 0 | 11,210 | 498,651 | 1,498,651 |
| 29 | 73 | 8,500 | 128 | 12,560 | 0 | 12,688 | 528,783 | 1,528,783 |
| 30 | 74 | 8,500 | 128 | 14,235 | 0 | 14,363 | 559,246 | 1,559,246 |
| 31 | 75 | 8,500 | 128 | 16,133 | 0 | 16,261 | 589,830 | 1,589,830 |
| 32 | 76 | 8,500 | 128 | 17,803 | 0 | 17,931 | 620,781 | 1,620,781 |
| 33 | 77 | 8,500 | 128 | 19,645 | 0 | 19,773 | 651,946 | 1,651,946 |
| 34 | 78 | 8,500 | 128 | 21,541 | 0 | 21,669 | 683,283 | 1,683,283 |
| 35 | 79 | 8,500 | 128 | 23,592 | 0 | 23,720 | 714,643 | 1,714,643 |

METHOD OF PROVIDING INSURANCE

RELATED APPLICATIONS

This disclosure claims priority to U.S. Provisional Patent Application No. 60/810,163 entitled, "METHOD OF PROVIDING INSURANCE," filed on Jun. 2, 2006, which is incorporated in its entirety herein by reference.

FIELD

This invention relates to methods of providing universal life insurance and, in particular, to methods of providing variable universal life insurance.

BACKGROUND

Insurance companies offer a variety of life insurance products to suit various needs and goals of customers and policy holders. One such product is term life insurance, whereby a policy holder pays a premium to be insured against death, and in some cases serious injury, for a period of time specified by the policy term. A term life policy only remains in force for the policy term, and the policy accrues no cash value. More recently, insurance companies have offered different forms of permanent life insurance, whereby a policy holder may pay a single premium, periodic premium, or some combination to cover insurance costs for an open-ended policy and to fund one or more underlying savings and/or investment accounts. A permanent life insurance policy has an assured payout as long as the policy is kept in force and accrues a cash value through the underlying accounts. Permanent life insurance policies present a number of attractive features to customers in addition to the life insurance component itself, such as the tax advantages associated with investing in the underlying accounts.

Among the different types of permanent life insurance policies are universal life insurance and variable universal life insurance. Under a universal life insurance policy, premium payments beyond costs associated with the insurance component of the policy (e.g., the cost of insurance) are credited to the policy's cash value and may accrue interest, such as at a rate tied to an index and/or via a fixed-rate investment account. Subsequently, costs for maintaining the insurance component of the policy may be drawn from the cash value, allowing premium payments to be skipped. A variable universal life insurance policy has the further advantage of investing flexibility, providing a wide variety of investment vehicles and funds, often similar to mutual funds and/or sponsored by various asset managers, from which a customer may choose. The costs associated with the insurance component of a policy, and consequently the amount remaining from premium payments that are available for investment, depends on and may vary with a number of factors, including the age and health of the insured.

SUMMARY

Permanent life insurance policies such as universal life and variable universal life can often be confusing for customers due to the variability of the cost of insurance and the associated uncertainty in the amount of premium payments that will ultimately find its way into a policy's investment accounts. A need exists for a life insurance policy that provides level cost of insurance rates for a specific duration, while providing a death benefit and a cash value. The instant invention provides a method and an insurance policy that addresses these and other issues.

In one embodiment, a method of providing life insurance includes providing a universal life insurance policy to a client and leveling the cost of insurance rates for a specific death benefit for a specific period of time. The universal life insurance policy may be a variable universal life insurance policy, and the leveled cost of insurance rates may be derived from the expected cost of insurance rates for a comparable term life insurance policy.

In another embodiment of the invention, a method of providing life insurance includes providing a universal life insurance policy to a client of an asset manager and leveling the cost of insurance rates for a specific death benefit. The insurance policy may be selectively provided to the clients of the asset manager. The asset manager may receive asset management fees based on the total value of assets within the policy, such as a fixed percentage thereof. In some embodiments, these fees may be charged directly by the asset manager to the client or may be withdrawn from the policy's cash value.

In one embodiment, the client may choose investment vehicles from a list selected or pre-selected by an insurance company and may use the assistance of an asset manager. In some embodiments, the list of investment vehicles may be changed or updated by the insurance company. The client may transfer funds among the various investment vehicles.

In another embodiment, the asset manager may comprise an independent entity, independent of and/or not employed by the insurance company.

In another embodiment, the insurance policy is a non-modified endowment contract ("Non-MEC") and provides mechanisms for ensuring that the policy remains a Non-MEC.

In some embodiments, a method of providing life insurance includes receiving client data from a client, evaluating said data to determine a cost of insurance rate and leveling the cost of insurance rate. The client data may be stored either physically or electronically. The method may additionally include creating and managing an account whereby the client may access and change the client data, change investment choices, transfer funds, pay charges or premiums and/or request changes to the insurance policy electronically. The leveling of the insurance rate may include calculating a level cost of insurance rate based upon the level cost of insurance rates for term insurance of substantially the same duration and adding a funding requirement to the rate that accounts for at least one of: the time value of money, persistency differences given an increasing cost versus a level cost and any reserve impacts of having additional funds sooner to pay for future insurance charges.

In another embodiment, a method of managing a client's assets includes investing or advising a client to invest at least a portion of the client's assets in a universal life insurance policy such as a Securities and Exchange Commission ("SEC") registered variable universal life insurance policy, wherein the asset manager that invests the assets or provides the advice to the client is compensated based upon the total value of assets in the policy.

BRIEF DESCRIPTION OF THE DRAWINGS

The accompanying appendices and/or drawings illustrate various non-limiting, example, inventive aspects in accordance with the present disclosure:

FIGS. 3A-C show policy charges reports for three examples of policy payments and benefits in various embodiments.

DETAILED DESCRIPTION

Figure 1:
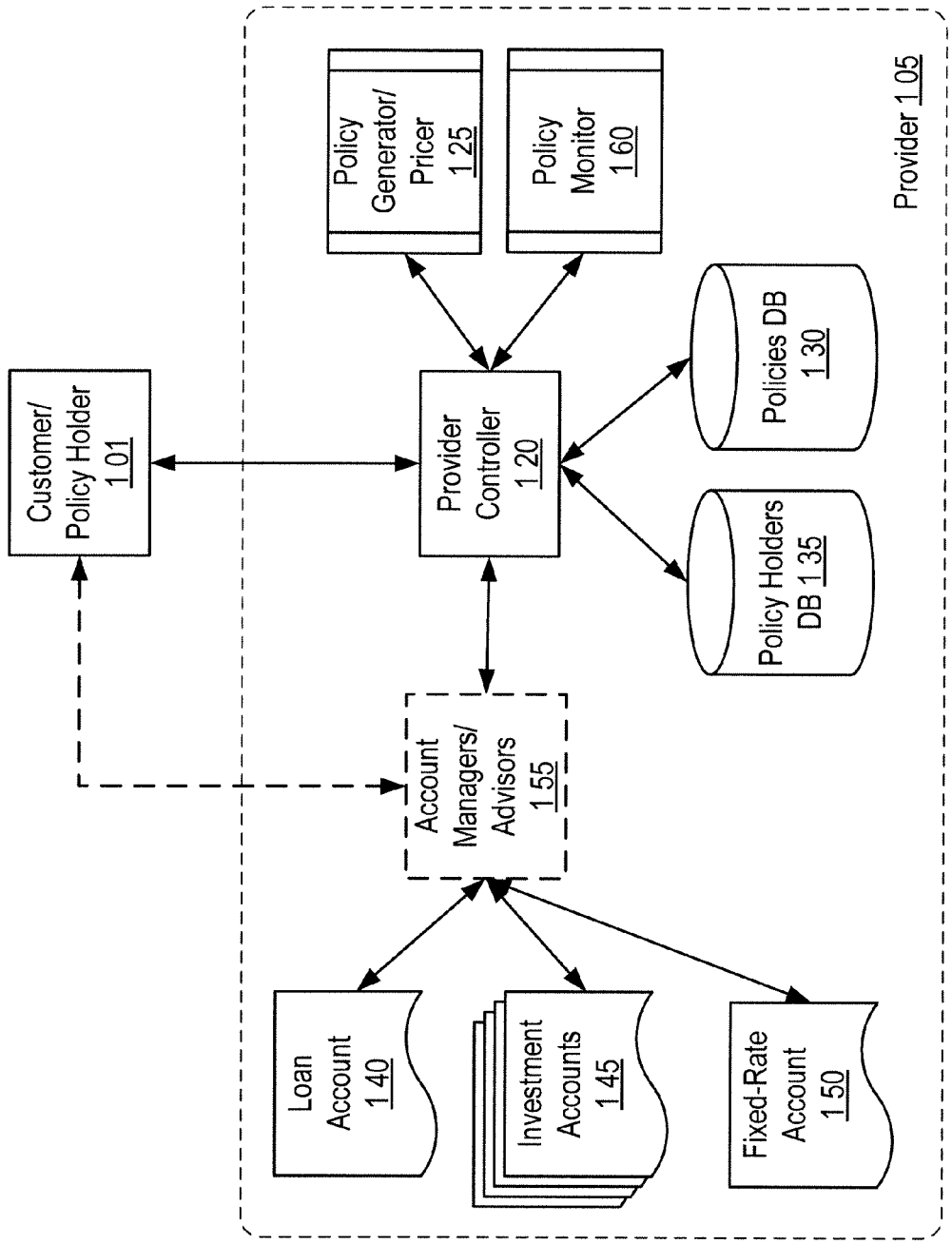
FIG. 1 shows an overview of data flow in one embodiment of ULNUL Insurance Provider operation.

The insurance policy of the present invention may be a universal life ("UL") or variable universal life ("VUL") insurance policy that provides a death benefit and builds a cash value. In a UL policy, the cash value is invested in a specific investment vehicle supported only by a general investment account of the insurance company with no participation by the client in selecting the vehicle. In a VUL policy, the cash value can be invested in a wide variety of separate accounts and the choice of which of the available separate accounts to use may be determined by the policy holder with or without the assistance of an asset manager. Some accounts that may be used in UL/VUL policies may include a fixed rate account, a loan account and investment accounts. By allowing the policy holder to choose the investments inside a VUL policy, the policy holder assumes the investment risk, and receives a greater potential return of the investments in return. The 'variable' component in the name refers to this ability to invest in volatile investments. The 'universal' component in the name refers to flexibility the owner has in making premium payments and selecting death benefit options and coverage levels. The premiums paid can vary from nothing in a given month up to maximums defined by the IRS Code for life insurance. This flexibility is in contrast to whole life insurance that has fixed premium payments that typically cannot be missed without lapsing the policy.

Generally, the following definitions are applicable to various aspects of UL/VUL policies:

Policy Value

The policy value serves as a starting point for calculating other values under a policy, such as the cash surrender value and, in some cases, the death benefit. Policy value may vary from day to day depending on factors such as the amount and timing of a premium payment, the performance of the investment accounts chosen, the interest rates of the fixed-rate account and loan account, policy charges, how much has been borrowed or withdrawn, and the level of policy and rider benefits. There is no guaranteed minimum policy value in a VUL policy.

Accordingly, the policy value:
equals the sum of all values in the fixed-rate account, the loan account, and in each investment account, is determined first on the policy date and on each date thereafter, has no guaranteed minimum amount and may be more or less than premiums paid.

Cash Surrender Value

The cash surrender value is the amount paid upon surrender of the policy and may be determined as of the end of the business day that an acceptable request to surrender is received. The cash surrender value at the end of any day equals:
the policy value as of such date minus any outstanding loan amount, and in some embodiments minus a surrender charge, which may be a percentage of the policy value or a prescribed dollar amount.

Investment Account Value

At the end of any business day, the investment account value is equal to the number of units in each investment account attributable to the policy multiplied by the unit value for that investment account. The number of units in any investment account at the end of any day equals:
units purchased with net premiums plus units purchased via transfers from another investment account, the fixed-rate account, and/or the loan account;
minus
units redeemed to pay monthly charges, units redeemed to pay partial withdrawals, units redeemed to pay transfer charges and/or any other charges incurred in connection with the exercise of rights under the policy, units redeemed as part of a transfer to another investment account, the fixed-rate account, or the loan account, and units redeemed for any applicable advisory or asset manager fees.

Unit Value

The unit value for each investment account may vary among investment accounts and may increase or decrease from one business day to the next. The unit value of any investment account at the end of any business day equals:
the unit value of the investment account on the immediately preceding business day multiplied by the net investment factor for that investment account on that business day.

The net investment factor:
measures the investment performance of an investment account from one business day to the next, increases to reflect investment income and capital gains (realized and unrealized) for the shares of the underlying portfolio, decreases to reflect any capital losses (realized and unrealized) for the shares of the underlying portfolio, as well as the underlying portfolio expenses and the mortality and expense risk charge, which is based upon set annual rates that may vary based on the total value in the investment accounts or the policy year. This charge may vary from 0.0-5% annually; for example 0.10, 0.25, 0.35, 0.5, 0.75, 0.95, 1.0, 1.25, 1.5, 1.75, 2.0, 3.0, or 4.0%, including any fractions of a percent within this range. Specific examples of this charge are:
0.95% of the total value in the investment accounts if the value of units in all investment accounts is less than $100,000;
0.65% of the total value in the investment accounts if the value of units in all investment accounts is from $100,000 to $500,000; and
0.35% of the total value in the investment accounts if the value of units in all investment accounts is over $500,000.
in policy years 21 and later, the annual rate may be 0.35% of the total value in the investment accounts regardless of the value of units in all investment accounts.

Fixed-Rate Account Value

The fixed-rate account value at the end of any day is equal to the net premium(s) allocated to the fixed-rate account plus any amounts transferred to the fixed-rate account (including amounts transferred from the loan account) plus interest credited to the fixed-rate account;
minus
amounts deducted to pay monthly charges, amounts withdrawn from the fixed-rate account, amounts used to pay transfer charges, charges to execute rights under the policy riders, charges to exercise the accelerated death benefit feature, amounts withdrawn from the fixed-rate account to pay advisory or asset manager fees, and amounts transferred from the fixed-rate account to an investment account or to the loan account.

UL and VUL policies may be considered to be types of permanent life insurance, because the death benefit will be paid if the insured dies any time up until the endowment or maturity age as long as there is sufficient cash value to pay the costs of insurance in the policy.

Both UL and VUL policies receive special tax advantages in the United States Internal Revenue Service ("IRS") Code. The cash value in life insurance is able to earn investment returns without incurring current income tax as long as it meets the definition of life insurance and the policy remains in force.

In a UL or VUL policy, the cost of insurance purchased is based on the difference between the death benefit and the policy value. The death benefit may be 1) the face amount, 2) the face amount plus policy value, or 3) the face amount plus premiums paid. Therefore, in some forms, the greater the cash value accumulation, the lesser the net amount at risk, and the less pure insurance that is purchased.

In some embodiments, the UL or VUL policy may offer guaranteed death benefits up to a certain age as long as a given minimum premium is paid.

UL and VUL policies have flexibility in choosing how much premium to pay for a given death benefit. The minimum premium amount is primarily affected by the policy features offered by the insurer. To maintain a death benefit guarantee, the minimum premium level must be met every month. To keep the policy in force, typically no premium needs to be paid as long as there is enough cash value in the policy to pay the costs of insurance and any fees and other charges. The maximum premium amounts are influenced by the IRS Code. IRS Code Section 7702 sets limits for how much cash value can be allowed and how much premium can be paid (both in a given year, and over certain periods of time) for a given death benefit without losing tax-deferred status.

Accordingly, an efficient policy in terms of cash value growth would have the maximum premium paid for the minimum death benefit. Then the costs of insurance would have the minimum negative effect on the growth of the cash value.

The IRS standards define a minimum death benefit for an amount of cash value and define a maximum premium for a given death benefit. If the maximum premium is exceeded, the policy no longer qualifies for all of the benefits of a life insurance contract and is instead known as a modified endowment contract or a MEC. A MEC still receives tax-free investment returns, and a tax-free death benefit, but withdrawals of cash value in a MEC are on a last-in, first-out basis, where earnings are withdrawn first and taxed as ordinary income. If the cash value in a policy exceeds a specified percentage of death benefit, the policy may no longer qualify as life insurance and all investment earnings may become immediately taxable in the year the specified percentage is exceeded. In order to avoid this, policies can define the death benefit to be the higher of the original death benefit or the amount needed to meet IRS guidelines. The minimum death benefit is determined to be a certain percentage of the policy value.

The maximum premiums are set by the IRS guidelines such that the premiums paid within a seven-year period after a qualifying event (such as purchase or death benefit increase), grown at a 4% rate, and using the maximum guaranteed costs of insurance defined by IRC Section 7702A, would endow the policy at the maturity age (i.e., the cash value would equal the death benefit). More specific rules are adjusted for premiums that are not paid in equal amounts over a seven-year period. The entire maximum premium (greater than the seven-year premium) can be paid in one year and no additional premiums can be paid (unless the policy is intended to become a MEC) unless the death benefit is increased.

Sometimes the seven-year MEC premium level cannot be paid in a policy every year for seven years and still avoid MEC status because of 7702 limits regarding total premiums paid into a policy. Accordingly, a premium may be set to be the maximum premium that can be paid every year a policy is in force. This is the premium that often reaches the most efficient use of the policy.

FIG. 1 shows an overview of data flow in one embodiment of UL/VUL Insurance Provider (hereafter "Provider") operation. A Customer 101 is coupled to a Provider 105 and/or Provider controller 120 to submit an insurance purchase request, profile information, policy change requests, instructions, premium payments, fees, penalty payments, loan and/or withdrawal requests, and/or the like to the Provider 105 in order to receive quotes, offers, policies, claim benefits, loans, withdrawals, and/or the like in return. A Provider controller 120 may serve as a central component within Provider 105 operation, coordinating and/or directing data exchange between various Provider modules. In the embodiment illustrated in FIG. 1, Customer input is fed directly to the Provider controller 120. However, in various implementations, Customer inputs may be initially relayed through an intermediary entity such as an insurance agent, website, and/or the like.

The Provider controller 120 is communicatively coupled to a Policy Generator/Pricer 125 capable of formulating a policy, including policy stipulations, endorsements, restrictions, pricing, and/or the like, based in part on the customer profile information 105. In one implementation, the Policy Generator/Pricer may determine a level cost of insurance for a fixed term of a UL/VUL insurance policy based on the corresponding price of a term life insurance policy available to the Customer 101 with the same term.

The Provider controller 120 is further coupled to a Policies database (DB) 130, which may include possible policies as well as policy components (e.g., stipulations, restrictions, endorsements, and/or the like) and/or rules for policy construction accessible by the Policy Generator/Pricer 125.

The Provider controller 120 is further coupled to a Policy Holders DB 135, wherein Customer and/or Policy Holder 101 information may be stored, such as in the context of a Policy Holder profile. Policy Holder profiles may contain Policy Holder identification information, contact information, demographic information, health information, and/or the like, as well as information pertaining to the policy or policies held by the Policy Holder. Policy Holder profiles may be periodically updated to reflect changes in Policy Holder and/or policy attributes.

The Provider controller 120 is further coupled to one or more policy accounts, such as a Loan Account 140, Investment Accounts 145, and a Fixed-Rate Account 150. The Loan Account 140 may track any loans taken against the policy and/or cash value component of the policy. The Investment Accounts 145 may track one or more investment vehicles associated with the policy. A wide variety of investment vehicles is envisioned as being within the scope of the policy, including but not limited to equities, debts, derivatives, synthetics, notes, stocks, preferred shares, bonds, debentures, options, futures, swaps, rights, warrants, commodities, currencies, long and/or short positions, shares of exchange-traded funds, and/or other assets or investment interests. The Fixed-Rate Account 150 may track one or more fixed-rate investment vehicles associated with the policy. In one implementation, Account Managers and/or Advisors 155 may assume management and/or administrative responsibilities over one or more of the aforementioned policy accounts. In one implementation, Account Managers and/or Advisors 155 may be employees of the insurance company, while in an alternative implementation, they may constitute an independent entity. In one implementation, the Provider 105 and/or Provider administrators interface directly with Account Managers and/or Advisors 155 to receive account options to provide to Customers and/or Policy Holders 101 as part of their insurance policies. In an alternative implementation, the Customers and/or Policy Holders 101 may directly interface with Account Managers and/or Advisors 155 to receive account options that may be incorporated into Provider 105 insurance policies.

The Provider controller 120 is further coupled to a Policy Monitor 160, which may monitor, track, and/or analyze policies, accounts, and policy holders. The Policy Monitor may, for example, be configured to detect and/or react to policy events, such as claims, lapses, term expirations, overpayment (e.g., avoiding MEC status, as described in further detail below), and/or the like. The Policy Monitor 160 may further be configurable to modify policy characteristics and/or issue notices, warnings, recommendations, and/or the like to Provider administrators and/or policy holders related to policy events.

In an alternative embodiment, any Provider modules or components, such as those illustrated in the embodiment shown in FIG. 1, may be incorporated within the Provider controller 120 itself, rather than existing as a separate, communicatively coupled entity.

In some embodiments, the insurance company will provide MEC avoidance techniques to assist and ensure clients or policy holders in avoiding MEC status. Such techniques include evaluation of the client's planned periodic premium prior to the policy date for compliance with the IRS requirements and advising the client of the potential for the policy to become a MEC. This evaluation and advice may include recalculation and adjustment of an appropriate periodic premium payment for the client.

After the policy date, the insurance company may monitor the premium payments, evaluate them against the seven-pay limit, place at least the premium amount that would exceed the limit in a separate expense account, advise the client of the potential for the policy to become a MEC, and only apply the amount to the policy after approval by the client. Other post-policy date monitoring may include monitoring and evaluation of instructions from the client regarding withdrawals, changes in death benefit options or changes in the face amount for the potential to cause the policy to become a MEC, advising the client of the potential and only proceeding upon instructions and/or approval from the client.

An additional MEC avoidance technique may be used if the policy inadvertently becomes classified as a MEC or if excess premium payments are made. In this case, the insurance company may attempt to enable the policy to continue to meet the seven-pay test and avoid becoming a MEC by refunding any excess premiums and related earnings to the client or by sequestering the excess and related earnings either as they are paid or after they are paid into a separate account. The client may then give explicit approval for the policy to become a MEC.

In other embodiments, the insurance policy may be a MEC and the seven-year limit and MEC avoidance techniques may not be utilized.

In order for a policy to qualify as life insurance under the IRS Code, a client must choose a tax test at the time of application for the policy. This test may be either the Guideline Premium Test or the Cash Value Accumulation Test. The Guideline Premium Test will be used as the tax law test applicable to the policy unless the Cash Value Accumulation Test is specifically elected. This election may not be changed once the policy is issued and may affect the maximum amount of premium paid into the policy, the amount of death benefit and the monthly deductions for the policy. The Guideline Premium Test generally allows the client to maintain a higher policy value in relation to death benefits. In general, the Cash Value Accumulation Test may allow the client to make higher premium payments during the policy's early years. It may also provide greater flexibility with regard to premium payment amounts.

Figure 2A:
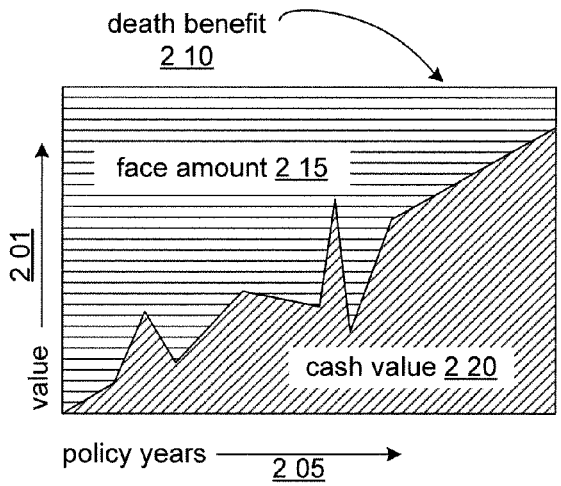
FIGS. 2A-C illustrate three options for policy death benefit levels.
Figure 2C:
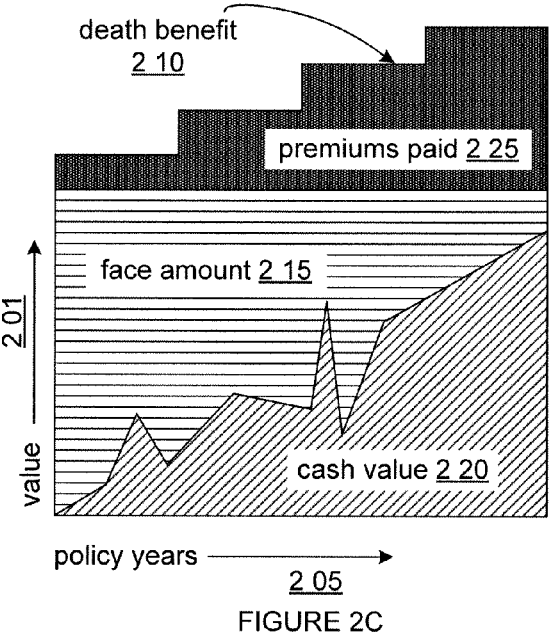
Figure 2B:
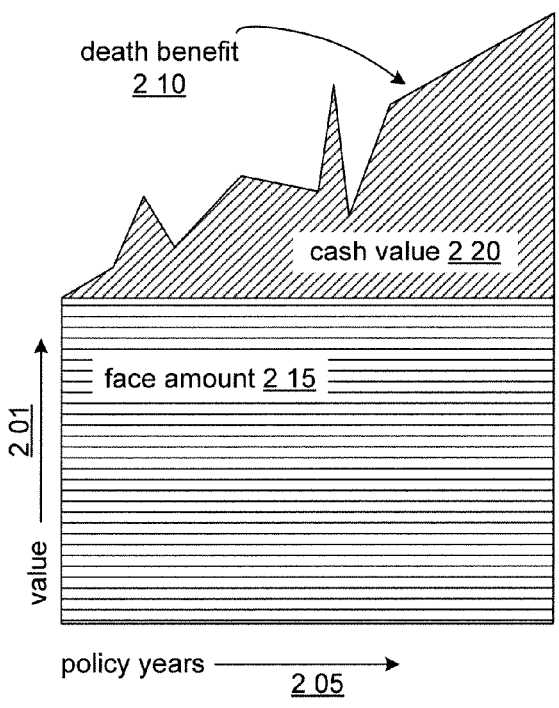

The death benefit may be selected from any of three options, illustrated in FIGS. 2A-C. The first option, shown as a graph of value 201 versus policy years 205 in FIG. 2A, provides for a level death benefit 210 that is the greater of the face amount 215 of the policy and the minimum death benefit required under the selected tax test, such as may be affected by the policy's cash value 220. The second option, illustrated in FIG. 2B, provides a death benefit 210 that is the greater of the face amount 215 plus the policy cash value 220 and the minimum death benefit required under the selected tax test. The third option, illustrated in FIG. 2C, provides a death benefit 210 that is the greater of the face amount 215 plus all of the premiums credited to the policy 225 since the issue date and the minimum death benefit required under the selected tax test.

A VUL policy may offer a wide variety of number and type of choices for investment vehicles in a wide variety of separate accounts, also known as sub-accounts. Such vehicles may be any investment vehicle known to those of skill in the art that are allowed to be within a life insurance contract. Examples of such investment vehicles include cash, personal and real property, stocks, bonds, mutual funds, options, commodities and futures. In one embodiment, the client may choose investment vehicles from a list of vehicles selected or pre-selected by the insurance company. In one embodiment, the funds may be in a variable insurance trust. Separate accounts may be organized as trusts to be managed for the benefit of the policy holder, and are "separate" because they are kept separate from the general account, which is the other reserve assets of the insurer. In some embodiments, the policy may provide at the election of the client for dollar cost averaging and/or automatic account rebalancing.

A UL/VUL policy may have any or all of the following tax advantages:
a. Tax-free investment earnings while a policy is in force
b. First-in, first-out funds withdrawal status from non-MEC policies
c. Tax-free policy loans from non-MEC policies
d. The death benefit is paid income tax free if premiums are paid with after-tax dollars.

As a result, for some clients of asset managers, minimization of taxes may be a reason to use a UL/VUL policy over other accumulation strategies.

UL/VUL policy premiums may be paid according to any recurring time period, such as daily, weekly, monthly, quarterly, semiannually, annually or on a single sum basis. Alternatively, the premiums may be paid according to no fixed schedule and lapse may be avoided as long as the policy value is sufficient to cover any charges, recurring or non-recurring, when due. The premiums may have a set minimum, and may be paid according to any method of payment including by automatic payments, check, cash or any other exchange of value.

The face amount (amount of insurance coverage) is selected when applying for the policy. After the first policy year and while the policy is in force, the face amount may be changed.

In some states, there may be an accelerated death benefit feature that allows for accelerated payment of part or all of the death benefit if the insured develops a terminal illness.

Upon receipt of the policy, a right to cancel period begins and lasts for a specific length of time according to state law. During this period, the policy may be returned for a refund. Some states require refund of all payments if the policy is returned during the right to cancel period. In addition, at any time while the policy is in force, the client may make an acceptable request to surrender the policy in exchange for the cash surrender value. It may also be possible to make partial withdrawals of the cash surrender value from the policy.

In some embodiments, loans may be taken against the policy at any time after the end of the right to cancel period while the insured is alive. In one embodiment, the loan is taken against the cash value of the ULNUL policy without incurring tax penalties. The minimum loan amount is established which may be a minimum dollar amount such as $1,000 or any other dollar amount or any percentage based on a policy parameter such as 1-20% of the cash surrender value, and the maximum loan amount is established which may be any dollar amount above the minimum dollar amount or any percentage amount such as 50-90% of the cash surrender value. Interest may be charged in arrears on the loan at a fixed annual rate. This rate may be any acceptable rate under state laws; for example, it may be 0-15%, such as 0, 1, 2, 3, 4, 5, 6, 7, 8, 9, 10, 11, 12, 13, or 14% and any fraction of a percent within this range, such as 4.25%, 5.0%, or 5.625%, or it may be related to an external index. Interest credited on amounts in the loan account ("earned interest rate") may be at a fixed annual rate of from 0-15% and any fraction of a percent within this range or as a margin rate from the loan interest charge rate such as 0-2.0% below the loan interest charge rate, such as 0.10, 0.25, 0.35, 0.5, 0.65, 0.75, 1.0, 1.10, 1.25, 1.5, or 1.75% below the loan interest charge rate, and the rate may be changed periodically during the lifetime of the policy. For example, the fixed annual rate may be 4.35% during policy years 1-10 and may be 4.80% for policy years 11 and thereafter. In some embodiments, when a loan is taken out, an amount equal to the loan is transferred out of the fund value in the sub-accounts into a loan account to secure the loan. The loan account may be part of the insurance company's general account and amounts held in the loan account may be credited with the fixed rate of interest as discussed above.

In some embodiments, the life insurance policy may also include various riders and endorsements known to those of skill in the art. For example, the life insurance policy may include a waiver of monthly charges rider for certain issue ages that waives the monthly charge while the insured is disabled. Other riders may include a higher education charitable benefit rider that, at no additional charge, pays an amount equal to a fixed percentage of the face amount to a qualified institution of higher learning designated by the policy holder upon the death of the insured and an extended maturity benefit that, among other things, discontinues all charges automatically and at no additional cost once the insured reaches the maturity age and provides a death benefit equal to the policy value. Other rider forms may be available such as additional insured riders, children term riders, long-term care benefits, etc.

In some embodiments, the UL/VUL policy may be a single life insured or may have joint lives insured under a single policy with the last survivor or first to die benefit.

The insurance policy may have any or any combination of the charges and costs known to those of skill the art. These charges or costs may be calculated according to any methods known to those of skill in the art. The following table shows examples, in one embodiment of Provider operation, of some charges that may be applied and at least one method of calculating the charge. For example, some charges may be indicated to be a cost based on a percentage of a specific amount, while other charges may be based on a fixed amount per portion of value (such as $X per $1,000 in the policy) or may be a fixed value, such as $200. It should be understood that these values and methods of calculating them are for illustrative purposes only, and are not intended to be limiting in any way:

| Charge | Charge is Deducted | Example of Charge |
|---|---|---|
| Premium Tax Charge | Upon receipt of each premium payment | Applicable state premium tax rate as a percentage of premium and depends on the state of issue. The range is 0.50% to 3.50% |
| Surrender Charge | When policy is surrendered | As agreed upon in the policy |
| Partial Withdrawal Charge | At the time of each withdrawal | $20 or any other charge agreed upon |
| Transfer Charge | Upon transfer | $25 per transfer or any other charge agreed upon |
| Policy Fee | Periodically, such as daily, weekly, monthly, annually | As agreed upon in the policy; for example, a fixed fee for issue ages up to 18 years |
| Cost of Insurance | | |
| Minimum and Maximum Charge | Periodically, such as daily, weekly, monthly, annually | Annual rate of $0.36-$1,000 per $1,000 of net amount at risk or a monthly rate of $0.03-85 per $1,000 of net amount at risk |
| Example: Charge for a Preferred Non-Tobacco Male Insured with an Issue Age of 42 during the First Policy Year | Periodically, such as daily, weekly, monthly, annually | Annual rate of $2.75 per $1,000 of net amount at risk or a monthly rate of 0.0862 per $1,000 of net amount at risk |
| Mortality and Expense Risk Charge | Periodically, such as daily, weekly, monthly, annually | Annual rate of 0-1.25% that may change depending on the policy year |
| Loan Interest Charge | Periodically, such as daily, weekly, monthly, annually | Fixed annual percentage rate from 0-15% or a variable rate tied to an external index |
| Loan Account Crediting Rate | Periodically, such as daily, weekly, monthly, annually | Fixed annual rate from 0-15% or a margin offset from the loan interest charge rate such as an offset of 0-2% |
| Accelerated Death Benefit Charge | At the time the accelerated death benefit is paid | None or a fixed fee and may be discounted for interest |
| Waiver of Monthly Charges Rider | Periodically, such as daily, weekly, monthly, annually | 3%-19% of monthly deduction |
| Example: Charge for a Male Insured with Issue Age of 46 | Periodically, such as daily, weekly, monthly, annually | 7.2% of monthly deduction |
| Level COI Endorsement | Periodically, such as daily, weekly, monthly, annually | No specific charge, but provides for annual rates of $0.397 to $59.43 per $1,000 of net at risk depending upon age and length of level COI period selected. |
| Higher Education Charitable Benefit Rider | As agreed upon in the policy | As agreed upon in the policy |
| Extended Maturity Benefit | As agreed upon in the policy | As agreed upon in the policy |
| Gross Total Annual | According to each individual investment | As required by the individual investment vehicle; for example, |

-continued

| Charge | Charge is Deducted | Example of Charge |
| --- | --- | --- |
| Portfolio Operating Expenses (before any contractual waivers or reimbursements) | vehicle | 0.06-1.6% |
| Net Total Annual Portfolio Operating Expenses (net of any contractual waivers or reimbursements) | According to each individual investment vehicle | As required by the individual investment vehicle; for example, 0.06-1.6% |

The cost of insurance (COI) may be calculated using any known method. It may depend upon any number of variables, including issue age, underwriting class, policy year, policy value, death benefit option, face amount, sex, and/or the like. In one embodiment, the COI may be equal to the monthly cost of insurance rate multiplied by the net amount at risk for the policy on the charge date. In one embodiment, the net amount at risk equals the death benefit at the charge date divided by an interest factor such as 1.00246627 minus the policy value on the charge date. These rates normally are not greater than the guaranteed cost of insurance rates in a policy, which may be based, in part, upon a set mortality table such as the 1980 Commissioners Standard Ordinary (CSO) Mortality Table or 2001 CSO Mortality Table or any other acceptable mortality table in addition to other factors.

In one embodiment, an insurance policy is provided with a level cost of insurance (LCOI) endorsement. The LCOI endorsement may serve to alter the normal attained age rates (i.e., those that are charged for the insurance risk at each age, which reflect the changing mortality risk) and convert them into a level cost over some pre-determined period. The conversion factors in the time value of money, persistency differences given an increasing cost versus a level cost, and any reserve impacts of having additional funds sooner to pay for future insurance charges. The endorsement may be provided with a new policy or may be added to an existing policy. This endorsement may level the non-guaranteed cost of insurance ("COI") rates applied to a specific layer of coverage under a base universal or variable universal life insurance policy. The endorsement may have minor variations in the descriptions herein due to the state approval process for life insurance that can necessitate state specific limitations or alterations in terms.

The policy holder or client chooses the duration of the LCOI rates. The duration may be any agreed upon duration offered by the insurance company, including up to the maturity age of the policy and thus may be, for example, from 2-130 years, such as 5-121, 10-100, 15-75, or 20-50 years. For example, in some embodiments, the duration may be 5, 10, 15, 20, 25, 30 or 40 years. The duration may be available depending on the age of the insured at his or her last birthday at the time of the endorsement. The duration periods may be provided to match age limits associated with a level term insurance product as approved by a specific state. For example, the available periods may approximately or exactly match those periods approved by the New York State Insurance Department.

The LCOI rates may equal the monthly premium rates for the corresponding term life insurance products (i.e., level term insurance rates with the same duration). These rates may depend on any of a variety of factors. In one embodiment, these rates depend on any one or any combination of the following factors: the LCOI duration selected, the total face amount of the policy, policy year, gender, age at issue and underwriting class of the insured.

An optional funding requirement may be required to have the non-guaranteed rates become guaranteed under an LCOI endorsement. In one embodiment, the funding requirement for the LCOI endorsements attached to a policy will be satisfied when A is no less than B, where:

A=the total premium paid less withdrawals taken while the LCOI endorsement is attached to the base policy; and B=the sum of monthly LCOI funding requirement premiums for each month elapsed while an LCOI endorsement is attached.

Other embodiments of the LCOI endorsement anticipate a different, reduced, or higher funding requirement or no funding requirement. In addition, in one embodiment, the LCOI endorsement may account for any or all additional expense charges. This may be accomplished by providing a "non-level" mortality charge and a counter expense charge that changes that when added together achieve level costs including any one or all additional expense charges. Other embodiments anticipate changes in the minimum reserve requirements or in the standard insurance mortality table, allowing for the LCOI rates and/or the funding requirement to be adjusted accordingly.

The LCOI funding requirement premiums may be approximately equal to the monthly premium to endow the base policy. These premium calculations may assume that the currently payable scale of non-guaranteed charges continues indefinitely, that assets earn a specific gross return, that the policy endows at a specific age, and/or that the base policy is newly issued upon addition of the endorsement. This premium may change due to any number of factors including changes in the base policy's face amount or death benefit option, the insured's underwriting class, and/or any additional riders or endorsements. If premium payments are ever insufficient, the policy holder may satisfy the funding requirement by paying an additional amount at least equal to the premium deficiency.

When added at the same time the policy issues, an LCOI endorsement may be added without any additional evidence of insurability beyond that required for the base policy. When added to an existing policy, evidence of insurability may be required. For any given layer of coverage, only one LCOI may be in effect at one time, but multiple layers may each have an LCOI endorsement.

The policy holder may terminate the endorsement at any time at no additional cost. If not terminated by the policy holder, the endorsement will terminate at the end of the LCOI period assuming that the layer of coverage continues to stay in force until that time. When the endorsement terminates, both the non-guaranteed and the guaranteed cost of insurance rates for the layer will be as if the endorsement had never been attached. Alternatively, the policy holder may elect to add an additional LCOI endorsement after a preceding endorsement terminates. When adding a new endorsement, the insured may be required to provide proof of insurability and/or pass a medical examination. The number of endorsements that may be added may be limited by age, which may be less than the policy maturity age.

In one embodiment, as long as the funding requirement is satisfied (i.e., the premiums paid are equal to or greater than the accumulated funding requirement premiums owed), the guaranteed maximum COI rates will equal the non-guaranteed LCOI rates. If an LCOI is added after initial policy issue, the initial premium paid may equal the policy value at the date of the endorsement. If and while the funding requirement is not satisfied, the guaranteed maximum COI rates will be the greater of the non-guaranteed LCOI rates and the guaranteed maximum COI rates that would apply in the absence of the endorsement. In one embodiment, any change in the COI rates caused by a change in compliance with the funding requirement may be applied prospectively only and may not affect the cash values.

In some years of the LCOI period, the LCOI rates may exceed the base policy guaranteed maximum COI and therefore become the new maximum guaranteed COI at those specific years. The policy holder may terminate the endorsement at any time.

In some embodiments, the LCOI endorsement may be available only to clients within certain age ranges. For example, the endorsement may not be available to clients younger than 18 years old or older than 70 years old.

In some embodiments, the insurance products disclosed herein offer customers and/or policy holders an attractive investment option that allows them to receive the security of life insurance while simultaneously receiving investment benefits such as tax deferral. Indeed, for a variable universal life insurance policy configured in accordance with aspects of the instant disclosure, a customer may select from a range of investment products, vehicles, funds, and/or the like and be provided with advice and/or management expertise of one or more professional asset managers. The simultaneous advantage of professional asset management/advice and tax deferral yields a product that is uniquely suitable for a range of investment goals and would likely lead to increased patronization. Asset managers would, consequently, have an incentive to partner with the insurance companies providing the insurance product in order to manage a larger amount of assets and, therefore, receive larger fee payments.

These asset management fees may be agreed upon by the client and the asset manager. This agreement may be separate from the policy and may be between the client and the asset manager with no involvement of the insurance company. This agreement may be disclosed to the insurance company to ensure compliance with the insurance company's policies and regulatory requirements. The fees may be paid directly by the client to the asset manager or may be paid to the asset manager from the policy cash value. Examples of such fees may be a fixed percentage of the total value of the assets within the policy. Such percentages may vary from 0.0-5% or more depending upon the agreement with the client and between the client and the asset manager; for example, 0.25, 0.5, 0.75, 1.0, 1.25, 1.5, 2.0, 2.5, 3.0, 3.5, 4.0, or 4.5% and any fraction of a percent within this range.

In alternative embodiments, the insurance company may provide a list of preferred asset managers to the client for selection. When selected, the asset manager fee may be taken from the insurance company fees rather than be withdrawn from the policy value or paid directly by the client.

It should be understood that the asset manager may be responsible for assisting the client with managing the investment of the assets in the policy and is not responsible for servicing the insurance policy. In some embodiments, the asset manager only provides advice to the client regarding selection of investment vehicles and does not select which individual investment vehicles are included in the policy or are available in the policy. The asset manager may manage a client's assets by providing advice to the client to invest in a UL/VUL policy and/or invest the funds for the client. In some embodiments, the asset manager may be a trustee.

In some embodiments, the insurance company may maintain a computer system to create, service, manage, maintain, and/or the like any or all of its insurance products, policies, accounts, customer information, and/or the like. An embodiment of such a computer system is described with reference to a Provider controller below.

In some embodiments, the computer system may be capable of enrolling new clients in a policy or updating an existing policy by receiving client data such as, for example, personal data, investment selections, payment choices and levels and other information necessary for servicing the policy and calculating premium and funding requirement payments in addition to any and all charges associated with the insurance policy. The computer system may store the client data in an individual profile, such as within a Policy Holders table, using any known storage technology, and this data may be updated. The computer system may implement the policy based on options selected by and information provided by the client or an agent of the client, such as an asset manager. The implementation and continued servicing may involve periodic evaluation of the client data, premium payments, payment history, investment selections, cash and policy value and MEC status by the computer or with the assistance of the computer/software running on the computer. The periods for evaluation may be regular, such as daily, weekly, monthly, quarterly, semiannually, annually or any other regular period, or evaluation may be performed at irregular intervals or upon changes to the policy by the client, asset manager of the client or the insurance company.

In some embodiments, the client or asset manager of the client may implement changes to the policy such as, for example, changes to the personal data or beneficiary designations, transfers between and among investment vehicles, changes in the policy such as addition or deletion of endorsements or riders, and may make electronic payment of premiums, funding requirements, charges and fees or perform other actions to obtain or service the insurance policy using the computer system such as via web access or interactive voice response systems. Such changes may be performed using secure, password protected, and/or encrypted connections and data transfer and may require approval of the insurance company.

For further illustration of an embodiment of the present invention the following hypothetical example is provided:

EXAMPLE

Assuming a 35-year-old non-smoking male in good health seeks $1,000,000 of life insurance coverage.

The normal cost of insurance on an age-related basis for the first 20 years of coverage without level cost of insurance would be $63/month at age 35 to $150/month at age 54. With a 20-year level cost of insurance endorsement, the cost of insurance would be $75/month from age 35 to 54. This cost of insurance can be guaranteed if sufficient additional premium is paid. This premium would be an additional $272/month for a total of $347/month. The additional $272 would go towards cash accumulation within the policy.

At the end of the 20-year period for the level COI endorsement, the rates will automatically revert to the age-related rates ranging from $161/month at age 55 to $1,439/month at age 74. Alternatively, the person may qualify for and select another LCOI endorsement. If another 20-year LCOI is selected, the COI rates would be $376/month from age 55 through age 74 and may be guaranteed by paying an additional $694/month of cash accumulation, for a total of $1,070/month.

FIGS. 3A-C show policy charges reports for further examples of policy payments and benefits in various embodiments. These reports have been computed for a 45-year-old preferred plus, non-tobacco male under a policy with an initial face amount of $1,000,000, an annual rate cost of insurance option, an annual planned premium payment of $8,500, and subject to a Section 7702 Guideline Premium Test. Additional fees and charges may be included, such as fund management charges, partial withdrawal fees, mortality and expense risk charges, and/or the like. FIG. 3A shows a charge report, including policy year 301, age 305, premiums paid 310, state premium tax charge 315, cost of insurance 320, cost of riders 325, total insurance costs 330, cash surrender value 335, and death benefit proceeds 340, under an annual renewable term (ART) life insurance policy. It is evident that, in this case, the cost of insurance component 320 of the charges is increasing with increasing policy year 301. FIG. 3B shows a charge report for a Provider policy configured with a 10-year level cost of insurance endorsement, which is reflected in the costs of insurance values 320 through policy year 10. Corresponding adjustments to the total cost of insurance 330, cash surrender value 335, and death benefit proceeds 340 are also evident. FIG. 3C shows a charge report for a Provider policy configured with a 20-year level cost of insurance endorsement, which is reflected in the cost of insurance values 320 through policy year 20. Corresponding adjustments to the total costs of insurance 330, cash surrender value 335, and death benefit proceeds 340 are again evident.

Various Applications

Provider generated UL or VUL insurance policies with an LCOI endorsement have a number of advantages over existing life insurance policies, such as providing policy customers and/or holders with a simple, transparent, and predictable cost of insurance component. In particular, customers' awareness of the exact component of their premium payments that are directed to cost of insurance may increase confidence in their control over the amount directed to their investment accounts and/or fixed-rate accounts. That increased confidence may translate to an increased market share for LCOI UL and VUL insurance products.

In one embodiment, UL or VUL policies generated by the Provider may serve as the basis for a personal retirement plan and/or portfolio by allowing a policy holder to borrow against the policy's cash value. These loans, tracked by a policy loan account, may be repaid by the policy's death benefit upon death of the policy holder.

In another embodiment, the Provider may generate one or more UL or VUL insurance policies, configurable to include LCOI endorsements, that serve as the basis for a group life insurance policy, a group rating for a composite of individual life insurance policies, and/or may be incorporated within an employee benefits program. In such an embodiment, an employer may select a single policy from the Provider for coverage of a plurality of employees, whose actual names may or may not be included in the policy. The employer may receive the master policy while participating employees may receive certificates of insurance and/or the like, specifying their benefits. In one implementation, all employees may receive policy coverage as an employment benefit while, in another implementation, employees may be offered the option to participate in the policy, such as by buying into the policy at a full or discounted price. In one implementation, only a select subset of employees may be offered the opportunity to participate in the policy. In still another implementation, employees must meet a set of participation qualifications before being offered the opportunity to participate in the policy. Determination of an LCOI for a fixed-period UL or VUL group policy may be made based on the cost of insurance for a comparable group term life insurance policy, such as may be available to the group seeking coverage, that includes a comparable coverage amount, and has a comparable term.

In another embodiment, a group life insurance policy of the form described above may form the basis for an employer's retirement program. For example, employees may pay a portion of their income to cover premiums for the policy and, in turn, receive coverage under the policy. When a covered employee dies, the life insurance benefit may be paid into a retirement account repository from which retirement benefits may be paid to retired or retiring employees.

In some embodiments, the insurance policy product may be offered and marketed as a private placement insurance policy or, alternatively, as an SEC registered insurance policy. Private placement policies may provide for greater flexibility in selecting investment vehicles and may provide different limits on the amount that may be invested. These limits and flexibilities are known to those of skill in the art.

In one embodiment, the insurance products described herein and/or configured in accordance with aspects of the instant disclosure may be marketed and/or otherwise made available through the marketing and/or distribution channels of an investment company, financial advisor, asset manager, and/or the like. In one embodiment, a representative of one of these institutions is registered with the insurance company before he or she is allowed to market, sell, and/or distribute the insurance products.

Provider Controller

Figure 4:
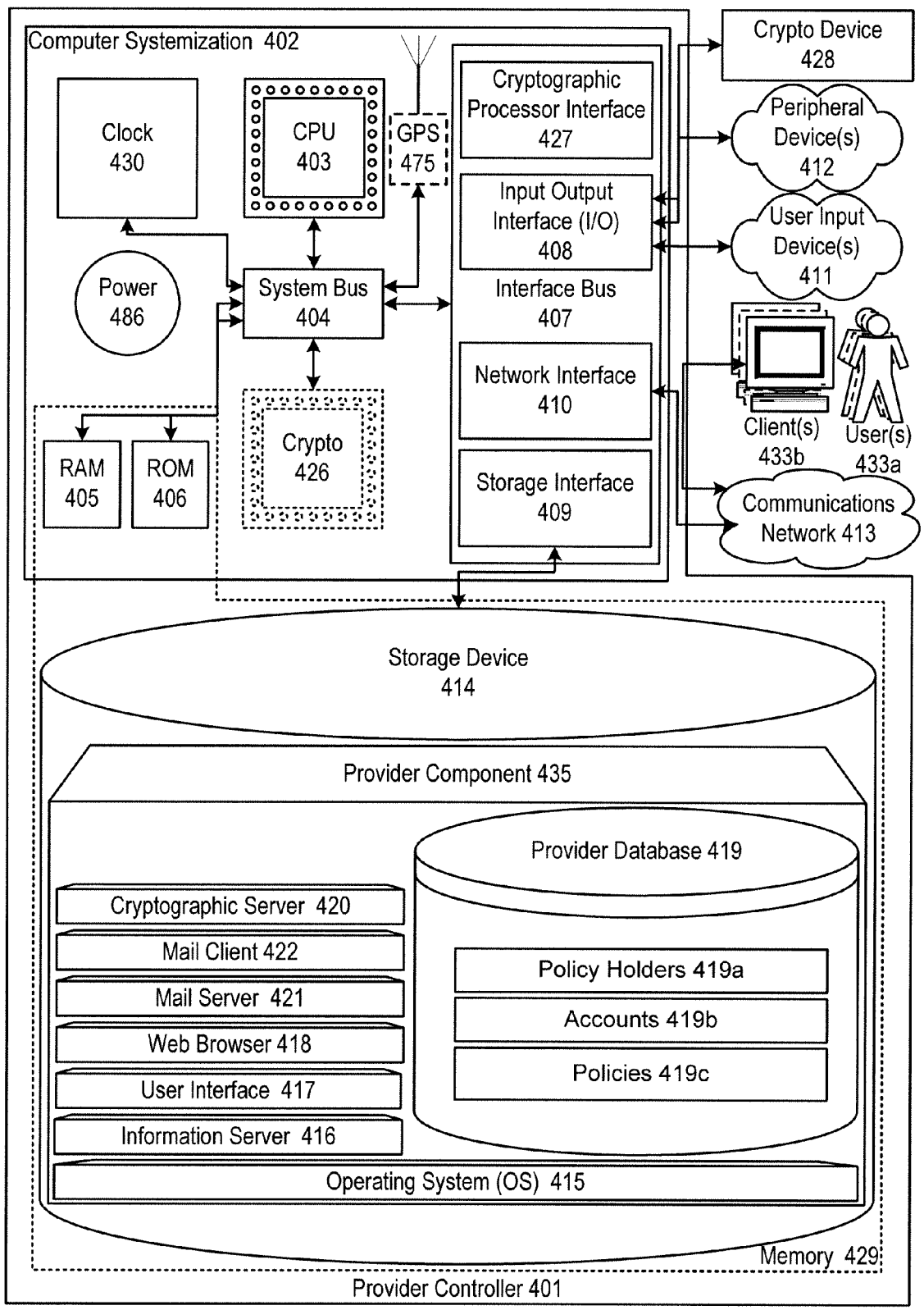
FIG. 4 is of a block diagram illustrating embodiments of the present invention of a Provider controller.

FIG. 4 of the present disclosure illustrates inventive aspects of a Provider controller 401 in a block diagram. In this embodiment, the Provider controller 401 may serve to aggregate, process, store, search, serve, identify, instruct, generate, match, and/or update databases, database elements, database element fields, and/or other related data.

Typically, users, which may be people and/or other systems, engage information technology systems (e.g., commonly computers) to facilitate information processing. In turn, computers employ processors to process information; such processors are often referred to as central processing units (CPU). A common form of processor is referred to as a microprocessor. CPUs use communicative signals to enable various operations. Such communicative signals may be stored and/or transmitted in batches as program and/or data components facilitate desired operations. These stored instruction code signals may engage the CPU circuit components to perform desired operations. A common type of program is a computer operating system, which, commonly, is executed by CPU on a computer; the operating system enables and facilitates users to access and operate computer information technology and resources. Common resources employed in information technology systems include: input and output mechanisms through which data may pass into and out of a computer; memory storage into which data may be saved; and processors by which information may be processed. Often information technology systems are used to collect data for later retrieval, analysis, and manipulation, which is commonly facilitated through a database program. Information technology systems provide interfaces that allow users to access and operate various system components.

In one embodiment, the Provider controller 401 may be connected to and/or communicate with entities such as, but not limited to: one or more users from user input devices 411;

peripheral devices 412; a cryptographic processor device 428; and/or a communications network 413.

Networks are commonly thought to comprise the interconnection and interoperation of clients, servers, and intermediary nodes in a graph topology. It should be noted that the term "server" as used throughout this disclosure refers generally to a computer, other device, program, or combination thereof that processes and responds to the requests of remote users across a communications network. Servers serve their information to requesting "clients." The term "client" as used herein refers generally to a computer, other device, program, or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The Provider controller 401 may be based on common computer systems that may comprise, but are not limited to, components such as: a computer systemization 402 connected to memory 429.

Computer Systemization

A computer systemization 402 may comprise a clock 430, central processing unit (CPU) 403, a read only memory (ROM) 406, a random access memory (RAM) 405, and/or an interface bus 407, and most frequently, although not necessarily, are all interconnected and/or communicating through a system bus 404. Optionally, the computer systemization may be connected to an internal power source 486. Optionally, a cryptographic processor 426 may be connected to the system bus. The system clock typically has a crystal oscillator and provides a base signal. The clock is typically coupled to the system bus and various clock multipliers that will increase or decrease the base operating frequency for other components interconnected in the computer systemization. The clock and various components in a computer systemization drive signals embodying information throughout the system. Such transmission and reception of signals embodying information throughout a computer systemization may be commonly referred to as communications. These communicative signals may further be transmitted, received, and the cause of return and/or reply signal communications beyond the instant computer systemization to: communications networks, input devices, other computer systemizations, peripheral devices, and/or the like. Of course, any of the above components may be connected directly to one another, connected to the CPU, and/or organized in numerous variations employed as exemplified by various computer systems.

The CPU comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s). The CPU interacts with memory through signal passing through conductive conduits to execute stored signal program code according to conventional data processing techniques. Such signal passing facilitates communication within the Provider controller and beyond through various interfaces. Should processing requirements dictate a greater amount speed, parallel, mainframe and/or super-computer architectures may similarly be employed. Alternatively, should deployment requirements dictate greater portability, smaller Personal Digital Assistants (PDAs) may be employed.

Power Source

The power source 486 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 486 is connected to at least one of the interconnected subsequent components of the Provider thereby providing an electric current to all subsequent components. In one example, the power source 486 is connected to the system bus component 404. In an alternative embodiment, an outside power source 486 is provided through a connection across the I/O 408 interface. For example, a USB and/or IEEE 1394 connection carries both data and power across the connection and is therefore a suitable source of power.

Interface Adapters

Interface bus(ses) 407 may accept, connect, and/or communicate to a number of interface adapters, conventionally although not necessarily in the form of adapter cards, such as but not limited to: input output interfaces (I/O) 408, storage interfaces 409, network interfaces 410, and/or the like. Optionally, cryptographic processor interfaces 427 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 409 may accept, communicate, and/or connect to a number of storage devices such as, but not limited to: storage devices 414, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like. Network interfaces 410 may accept, communicate, and/or connect to a communications network 413. Through a communications network 413, the Provider controller is accessible through remote clients 433*b* (e.g., computers with web browsers) by users 433*a*. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 410 may be used to engage with various communications network types 413. For example, multiple network interfaces may be employed to allow for the communication over broadcast, multicast, and/or unicast networks.

Input Output interfaces (I/O) 408 may accept, communicate, and/or connect to user input devices 411, peripheral devices 412, cryptographic processor devices 428, and/or the like. I/O may employ connection protocols such as, but not limited to: Apple Desktop Bus (ADB); Apple Desktop Connector (ADC); audio: analog, digital, monaural, RCA, stereo, and/or the like; IEEE 1394a-b; infrared; joystick; keyboard; midi; optical; PC AT; PS/2; parallel; radio; serial; USB; video interface: BNC, coaxial, composite, digital, Digital Visual Interface (DVI), RCA, RF antennae, S-Video, VGA, and/or the like; wireless; and/or the like. A common output device is a television set 145, which accepts signals from a video interface. Also, a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Typically, the video interface provides the composited video information through a video connection interface that accepts a video display interface (e.g., an RCA composite video connector accepting an RCA composite video cable; a DVI connector accepting a DVI display cable, etc.).

User input devices 411 may be card readers, dongles, finger print readers, gloves, graphics tablets, joysticks, keyboards, mouse (mice), remote controls, retina readers, trackballs, trackpads, and/or the like.

Peripheral devices 412 may be connected and/or communicate to I/O and/or other facilities of the like such as network interfaces, storage interfaces, and/or the like. Peripheral devices may be audio devices, cameras, dongles (e.g., for copy protection, ensuring secure transactions with a digital signature, and/or the like), external processors (for added functionality), goggles, microphones, monitors, network interfaces, printers, scanners, storage devices, video devices, video sources, visors, and/or the like.

It should be noted that although user input devices and peripheral devices may be employed, the Provider controller may be embodied as an embedded, dedicated, and/or monitor-less (i.e., headless) device, wherein access would be provided over a network interface connection.

Cryptographic units such as, but not limited to, microcontrollers, processors 426, interfaces 427, and/or devices 428 may be attached, and/or communicate with the Provider controller. A MC68HC16 microcontroller, commonly manufactured by Motorola Inc., may be used for and/or within cryptographic units. Equivalent microcontrollers and/or processors may also be used. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of CPU. Other commercially available specialized cryptographic processors include VLSI Technology's 33 MHz 6868 or Semaphore Communications' 40 MHz Roadrunner 184.

Memory

Generally, any mechanization and/or embodiment allowing a processor to affect the storage and/or retrieval of information is regarded as memory 429. However, memory is a fungible technology and resource, thus, any number of memory embodiments may be employed in lieu of or in concert with one another. It is to be understood that the Provider controller and/or a computer systemization may employ various forms of memory 429. For example, a computer systemization may be configured wherein the functionality of on-chip CPU memory (e.g., registers), RAM, ROM, and any other storage devices are provided by a paper punch tape or paper punch card mechanism; of course such an embodiment would result in an extremely slow rate of operation. In a typical configuration, memory 429 will include ROM 406, RAM 405, and a storage device 414. A storage device 414 may be any conventional computer system storage. Storage devices may include a drum; a (fixed and/or removable) magnetic disk drive; a magneto-optical drive; an optical drive (i.e., CD ROM/RAM/Recordable (R), ReWritable (RW), DVD RIRW, etc.); an array of devices (e.g., Redundant Array of Independent Disks (RAID)); and/or other devices of the like. Thus, a computer systemization generally requires and makes use of memory.

Component Collection

The memory 429 may contain a collection of program and/or database components and/or data such as, but not limited to: operating system component(s) 415 (operating system); information server component(s) 416 (information server); user interface component(s) 417 (user interface); Web browser component(s) 418 (Web browser); database(s) 419; mail server component(s) 421; mail client component(s) 422; cryptographic server component(s) 420 (cryptographic server); the Provider component(s) 435; and/or the like (i.e., collectively a component collection). These components may be stored and accessed from the storage devices and/or from storage devices accessible through an interface bus. Although non-conventional program components such as those in the component collection, typically, are stored in a local storage device 414, they may also be loaded and/or stored in memory such as: peripheral devices, RAM, remote storage facilities through a communications network, ROM, various forms of memory, and/or the like.

Operating System

The operating system component 415 is an executable program component facilitating the operation of the Provider controller. Typically, the operating system facilitates access of I/O, network interfaces, peripheral devices, storage devices, and/or the like. The operating system may be a highly fault tolerant, scalable, and secure system such as Apple Macintosh OS X (Server), AT&T Plan 9, Be OS. Linux, Unix, and/or the like operating systems. However, more limited and/or less secure operating systems also may be employed such as Apple Macintosh OS, Microsoft DOS, Microsoft Windows 2000/2003/3.1/95/98/CE/Millenium/NT/Vista/XP (Server), Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the Provider controller to communicate with other entities through a communications network 413. Various communication protocols may be used by the Provider controller as a subcarrier transport mechanism for interaction, such as, but not limited to: multicast, TCP/IP, UDP, unicast, and/or the like.

Information Server

An information server component 416 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C#, Common Gateway Interface (CGI) scripts, Java, JavaScript, Practical Extraction Report Language (PERL), Python, WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the Provider controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the Provider database 419, operating systems, other program components, user interfaces, Web browsers, and/or the like.

Access to the Provider database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the Provider. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the Provider as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

The function of computer interfaces in some respects is similar to automobile operation interfaces. Automobile operation interface elements such as steering wheels, gearshifts, and speedometers facilitate the access, operation, and display of automobile resources, functionality, and status. Computer interaction interface elements such as check boxes, cursors, menus, scrollers, and windows (collectively and commonly referred to as widgets) similarly facilitate the access, operation, and display of data and computer hardware and operating system resources, functionality, and status. Operation interfaces are commonly called user interfaces. Graphical user interfaces (GUIs) such as the Apple Macintosh Operating System's Aqua, Microsoft's Windows XP, or Unix's X-Windows provide a baseline and means of accessing and displaying information graphically to users.

A user interface component 417 is a stored program component that is executed by a CPU. The user interface may be a conventional graphic user interface as provided by, with, and/or atop operating systems and/or operating environments such as Apple Macintosh OS, e.g., Aqua, GNUSTEP, Microsoft Windows (NT/XP), Unix X Windows (KDE, Gnome, and/or the like), mythTV, and/or the like. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 418 is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Some Web browsers allow for the execution of program components through facilities such as Java, JavaScript, ActiveX, and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Of course, in place of a Web browser and information server, a combined application may be developed to perform similar functions of both. The combined application would similarly affect the obtaining and the provision of information to users, user agents, and/or the like from the Provider enabled nodes. The combined application may be nugatory on systems employing standard Web browsers.

Mail Server

A mail server component 421 is a stored program component that is executed by a CPU 403. The mail server may be a conventional Internet mail server such as, but not limited to, sendmail, Microsoft Exchange, and/or the like. The mail server may allow for the execution of program components through facilities such as ASP, ActiveX, (ANSI) (Objective-) C (++), CGI scripts, Java, JavaScript, PERL, pipes, Python, WebObjects, and/or the like. The mail server may support communications protocols such as, but not limited to: Internet message access protocol (IMAP), Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the Provider.

Access to the Provider mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 422 is a stored program component that is executed by a CPU 403. The mail client may be a conventional mail viewing application such as Apple Mail, Microsoft Entourage, Microsoft Outlook, Microsoft Outlook Express, Mozilla Thunderbird, and/or the like. Mail clients may support a number of transfer protocols, such as: IMAP, Microsoft Exchange. POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 420 is a stored program component that is executed by a CPU 403, cryptographic processor 426, cryptographic processor interface 427, cryptographic processor device 428, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash function), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the Provider may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing an MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the Provider component to engage in secure transactions if so desired. The cryptographic component facilitates the secure accessing of resources on the Provider and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The Provider Database

The Provider database component 419 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the Provider database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of functionality encapsulated within a given object. If the Provider database is implemented as a data-structure, the use of the Provider database 419 may be integrated into another component such as the Provider component 435. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 419 includes several tables 419a-c. A Policy Holders table 419a includes fields such as, but not limited to: policy holder ID, policy holder name, password, contact info, policy selection, policy history, account selection, account history, payment history, and/or the like. An Accounts table 419b includes fields such as, but not limited to: account ID, account name, account holdings, account performance, associated policy holder(s), account manager ID(s), account manager name(s), account manager password(s), account terms and/or restrictions, and/or the like. A Policies table 419c includes fields such as, but not limited to: policy ID, policy name, policy terms and/or restrictions, associated policy holder(s), qualified account types, and/or the like. These and/or other tables may support and/or track multiple entity accounts on the Provider controller.

In one embodiment, the Provider database may interact with other database systems. For example, employing a distributed database system, queries and data access by Provider modules may treat the combination of the Provider database and another database as a single database entity.

In one embodiment, user programs may contain various user interface primitives, which may serve to update the Provider. Also, various accounts may require custom database tables depending upon the environments and the types of clients the Provider may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 419a-c. The Provider may be configured to keep track of various settings, inputs, and parameters via database controllers.

The Provider database may communicate to and/or with other components in a component collection, including itself, and/or facilities of the like. Most frequently, the Provider database communicates with the Provider component, other program components, and/or the like. The database may contain, retain, and provide information regarding other nodes and data.

The Provider Component

The Provider component 435 is a stored program component that is executed by a CPU. The Provider affects accessing, obtaining and the provision of information, services, transactions, and/or the like across various communications networks. As such, the Provider component enables one to access, calculate, engage, exchange, generate, identify, instruct, match, process, search, serve, store, and/or facilitate transactions to enable the provision of insurance. In one embodiment, the Provider component incorporates any and/or all combinations of the aspects of the Provider that were discussed in the previous figures and appendices.

The Provider component enabling access of information between nodes may be developed by employing standard development tools such as, but not limited to: (ANSI) (Objective-) C (++), Apache components, binary executables, database adapters, Java, JavaScript, mapping tools, procedural and object oriented development tools, PERL, Python, shell scripts, SQL commands, web application server extensions, WebObjects, and/or the like. In one embodiment, the Provider server employs a cryptographic server to encrypt and decrypt communications. The Provider component may communicate to and/or with other components in a component collection, including itself, and/or facilities of the like. Most frequently, the Provider component communicates with the Provider database, operating systems, other program components, and/or the like. The Provider may contain, communicate, generate, obtain, and/or provide program component, syste ser, and/or data communications, requests, and/or responses.

Distributed Provider

The structure and/or operation of any of the Provider node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the Provider controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like, Common Object Request Broker Architecture (CORBA), process pipes, shared files, and/or the like. Messages sent between discrete component components for inter-application communication or within memory spaces of a singular component for intra-application communication may be facilitated through the creation and parsing of a grammar. A grammar may be developed by using standard development tools such as lex, yacc, XML, and/or the like, which allow for grammar generation and parsing functionality, which in turn may form the basis of communication messages within and between components. Again, the configuration will depend upon the context of system deployment.

The entirety of this disclosure (including the Cover Page, Title, Headings, Field, Background, Summary, Brief Description of the Drawings, Detailed Description, Claims, Abstract, Figures, and otherwise) shows by way of illustration various embodiments in which the claimed inventions may be practiced. The advantages and features of the disclosure are of a representative sample of embodiments only, and are not exhaustive and/or exclusive. They are presented only to assist in understanding and teach the claimed principles. It should be understood that they are not representative of all claimed inventions. As such, certain aspects of the disclosure have not been discussed herein. That alternate embodiments may not have been presented for a specific portion of the invention or that further undescribed alternate embodiments may be available for a portion is not to be considered a disclaimer of those alternate embodiments. It will be appreciated that many of those undescribed embodiments incorporate the same principles of the invention and others are equivalent. Thus, it is to be understood that other embodiments may be utilized and functional, logical, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the invention, and inapplicable to others. In addition, the disclosure includes other inventions not presently claimed. Applicant reserves all rights in those presently unclaimed inventions including the right to claim such inventions, file additional applications, continuations, continuations in part, divisions, and/or the like thereof. As such, it should be understood that advantages, embodiments, examples, functional features, logical, organizational, structural, topological, and/or other aspects of the disclosure are not to be considered limitations on the disclosure as defined by the claims or limitations on equivalents to the claims. Portions of the specification have been reproduced from the Wikipedia article "Variable universal life insurance" (http://en.wikipedia.org/wiki/Variable_universal_life_insurance) and are licensed under the GNU Free Documentation License.

What is claimed is:

1. A processor-implemented method for providing life method comprising:

receiving a client application for a universal life insurance policy, the client application including at least a client eligibility criteria profile corresponding to a client;

receiving a level cost of insurance duration specification;

determining by the processor a level cost of insurance charge for a time period specified by the level cost of insurance duration specification, the level cost of insurance charge based at least in part on the level cost of insurance duration specification and a cost of insurance rate for a term life insurance policy available to the client based on the client application;

generating a level cost of insurance universal life insurance policy having the level cost of insurance charge provided for the level cost of insurance duration specification, wherein an amount equal to the level cost of insurance charge is extractable at least in part from a cash value of the policy, the cash value of the policy being funded at least in part by premium payments, wherein the level cost of insurance charge is distinguishable from a premium; and providing the level cost of insurance universal life insurance policy to the client.

2. The method of claim 1, wherein the level cost of insurance charge is further based on the time value of money.

3. The method of claim 1, wherein the level cost of insurance charge is further based on persistency differences given an increasing cost versus a level cost.

4. The method of claim 1, wherein the level cost of insurance charge is further based on reserve impacts of having additional funds sooner to pay for future insurance charges.

5. The method of claim 1, wherein the level cost of insurance universal life insurance policy is a level cost of insurance variable universal life insurance policy.

6. The method of claim 5, further comprising:

receiving a portfolio allocation specification from the client, the portfolio allocation specification specifying the composition of a client investment portfolio.

7. The method of claim 6, wherein the client investment portfolio is managed by an asset manager.

8. The method of claim 7, wherein management fees paid to the asset manager are based on a total value of assets managed.

9. The method of claim 8, wherein management fees are equal to a fixed percentage of the total value of assets managed.

10. The method of claim 8, wherein management fees are withdrawn from a policy cash value.

11. The method of claim 8, wherein management fees are paid directly by the client.

12. The method of claim 8, wherein management fees are paid from insurance company fees.

13. The method of claim 7, wherein the asset manager is selected from a list of preferred asset managers provided by an insurance company offering the variable universal life insurance policy.

14. The method of claim 5, wherein the level cost of insurance variable universal life insurance policy is a private placement policy.

15. The method of claim 1, wherein the client is an employer and the level cost of insurance universal life insurance policy is a group universal life insurance policy or a group rating for a composite of individual policies.

16. The method of claim 15, wherein the group universal life insurance policy is a group variable universal life insurance policy or a group rating for a composite of individual policies.

17. The method of claim 15, wherein coverage under the group universal life insurance policy is provided to employees of the employer as an employment benefit.

18. The method of claim 15, wherein the group universal life insurance policy is configured to provide retirement benefits.

19. The method of claim 1, wherein the level cost of insurance universal life insurance policy comprises a joint universal life insurance policy.

20. The method of claim 19, wherein the joint universal life insurance policy includes a first to die benefit.

21. The method of claim 19, wherein the joint universal life insurance policy includes a last to die benefit.

22. The method of claim 19, wherein the joint universal life insurance policy comprises a joint variable universal life insurance policy.

23. The method of claim 22, wherein the joint variable universal life insurance policy includes a first to die benefit.

24. The method of claim 22, wherein the joint variable universal life insurance policy includes a last to die benefit.

25. The method of claim 22, wherein an investment portfolio associated with the joint variable universal life insurance policy is managed by an asset manager.

26. The method of claim 25, wherein management fees paid to the asset manager are based on a total value of assets managed.

27. The method of claim 26, wherein management fees are equal to a fixed percentage of the total value of assets managed.

28. The method of claim 25, wherein management fees are withdrawn from a policy cash value.

29. The method of claim 25, wherein management fees are paid directly by the client.

30. The method of claim 25, wherein management fees are paid from insurance company fees.

31. The method of claim 1, wherein generating a level cost of insurance universal life insurance policy further comprises updating an existing universal life insurance policy with a level cost of insurance endorsement.

32. The method of claim 1, wherein the premium payments variable.

33. A system to provide life insurance, comprising:
a memory;
a processor disposed in communication with said memory, and configured to issue a plurality of processing instructions stored in the memory, wherein the instructions issue signals to:
receive a client application for a universal life insurance policy, the client application including at least a client eligibility criteria profile corresponding to a client;
receive a level cost of insurance duration specification;
determine a level cost of insurance charge for a time period specified by the level cost of insurance duration specification, the level cost of insurance charge based at least in part on the level cost of insurance duration specification and a cost of insurance rate for a term life insurance policy available to the client based on the client application;
generate a level cost of insurance universal life insurance policy having the level cost of insurance charge provided for the level cost of insurance duration specification, wherein an amount equal to the level cost of insurance charge is extractable at least in part from a cash value of the policy, the cash value of the policy being funded at least in part by premium payments, wherein the level cost of insurance charge is distinguishable from a premium; and
provide the level cost of insurance universal life insurance policy to the client.

34. The system of claim 33, wherein the level cost of insurance charge is further based on the time value of money.

35. The system of claim 33, wherein the level cost of insurance charge is further based on persistency differences given an increasing cost versus a level cost.

36. The system of claim 33, wherein the level cost of insurance charge is further based on reserve impacts of having additional funds sooner to pay for future insurance charges.

37. The system of claim 33, wherein the level cost of insurance universal life insurance policy is a level cost of insurance variable universal life insurance policy.

38. The system of claim 37, further comprising:
receive a portfolio allocation specification from the client, the portfolio allocation specification specifying the composition of a client investment portfolio.

39. The system of claim 38, wherein the client investment portfolio is managed by an asset manager.

40. The system of claim 39, wherein management fees paid to the asset manager are based on a total value of assets managed.

41. The system of claim 40, wherein management fees are equal to a fixed percentage of the total value of assets managed.

42. The system of claim 40, wherein management fees are withdrawn from a policy cash value.

43. The system of claim 40, wherein management fees are paid directly by the client.

44. The system of claim 40, wherein management fees are paid from insurance company fees.

45. The system of claim 39, wherein the asset manager is selected from a list of preferred asset managers provided by an insurance company offering the level cost of insurance variable universal life insurance policy.

46. The system of claim 37, wherein the level cost of insurance variable universal life insurance policy is a private placement policy.

47. The system of claim 33, wherein the client is an employer and the level cost of insurance universal life insurance policy is a group universal life insurance policy.

48. The system of claim 47, wherein the group universal life insurance policy is a group variable universal life insurance policy.

49. The system of claim 47, wherein coverage under the group universal life insurance policy is provided to employees of the employer as an employment benefit.

50. The system of claim 47, wherein the group universal life insurance policy is configured to provide retirement benefits.

51. The system of claim 33, wherein the level cost of insurance universal life insurance policy comprises a joint universal life insurance policy.

52. The system of claim 51, wherein the joint universal life insurance policy includes a first to die benefit.

53. The system of claim 51, wherein the joint universal life insurance policy includes a last to die benefit.

54. The system of claim 51, wherein the joint universal life insurance policy comprises a joint variable universal life insurance policy.

55. The system of claim 54, wherein the joint variable universal life insurance policy includes a first to die benefit.

56. The system of claim 54, wherein the joint variable universal life insurance policy includes a last to die benefit.

57. The system of claim 54, wherein an investment portfolio associated with the joint variable universal life insurance policy is managed by an asset manager.

58. The system of claim 57, wherein management fees paid to the asset manager are based on a total value of assets managed.

59. The system of claim 58, wherein management fees are equal to a fixed percentage of the total value of assets managed.

60. The system of claim 57, wherein management fees are withdrawn from a policy cash value.

61. The system of claim 57, wherein management fees are paid directly by the client.

62. The system of claim 57, wherein management fees are paid from insurance company fees.

* * * * *